UNITED STATES PATENT OFFICE.

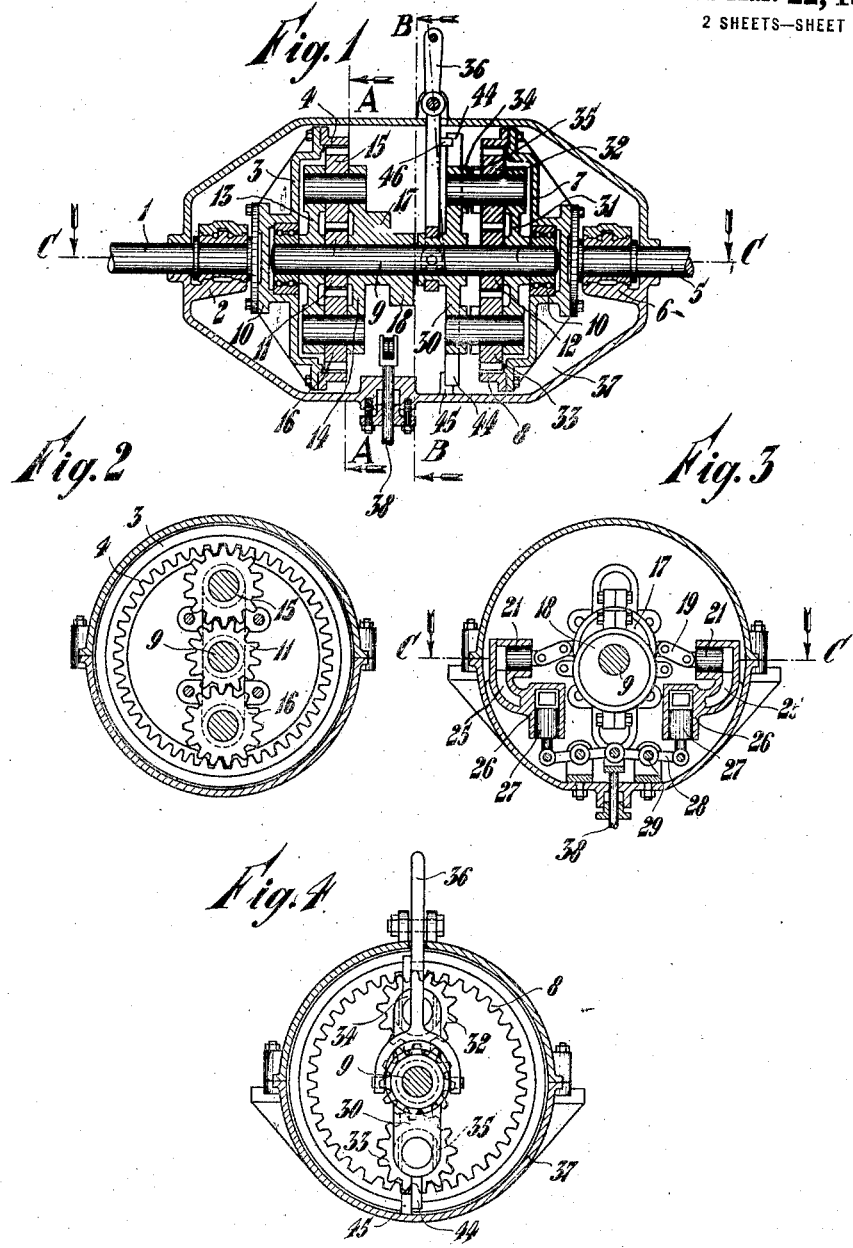

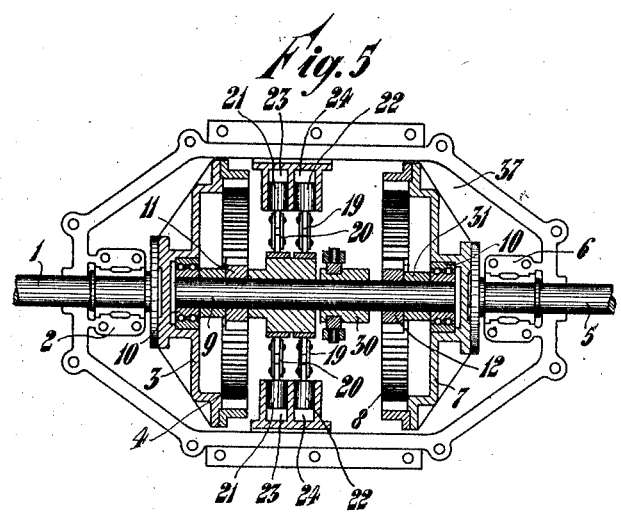
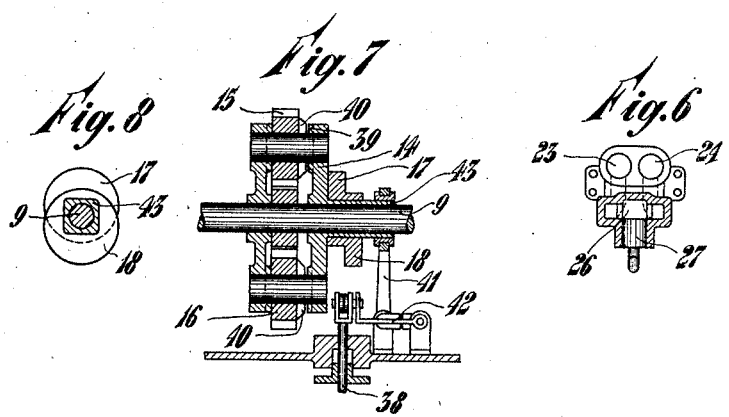

ARNO BOERNER, OF SCHEVENINGEN, NETHERLANDS.

CHANGE-SPEED MECHANISM.

1,372,268.  Specification of Letters Patent.  Patented Mar. 22, 1921.

Application filed May 19, 1919. Serial No. 298,110.

*To all whom it may concern:*

Be it known that I, ARNO BOERNER, having no nationality, residing at Scheveningen, the Netherlands, have invented certain new and useful Improvements in Change-Speed Mechanism, of which the following is a specification.

The present invention which relates to change-speed mechanism has for its object to vary the ratio between the rotary speeds of two shafts and to invert the direction of rotary motion without it being required to throw gear wheels into or out of action. The invention may be applied to motor cars, motor bicycles, aeroplanes, ships' motors, machine-tools, et cetera, briefly to any mechanism in which a variable rotary speed is required.

In accordance with the invention the improved mechanism, in which the driving shaft and the driven shaft are in axial alinement, comprises in combination a gear wheel fast on the driving shaft and a gear wheel fast on the driven shaft each of the said wheels gearing with one or a plurality of pinions which are rotatably supported by brackets loosely mounted on an intermediate shaft between and in axial alinement with the driving and the driven shafts, gear wheels fast on the intermediate shaft and gearing with the pinions carried by the said brackets, and a mechanism for braking the rotary motion of the said brackets in such a manner that when the brackets are prevented from rotating about their shafts the rotary motion of the driving shaft is transmitted to the intermediate shaft through the gear wheel on the driving shaft and its coacting pinions, and from the intermediate shaft to the driven shaft through the second set of pinions and the gear wheel coacting therewith.

In order that the brackets for supporting the pinions that coact with the driving gear wheel may be prevented from turning about their shafts one of said brackets may be connected with two eccentric disks one of which is turned through 180° relative to the other and coupled with plungers mounted in cylinders communicating through a by-pass filled with liquid, the said by-pass being provided with a throttle-valve or the like in such a manner that on the said throttle-valve being closed the plungers are prevented from reciprocating, whereby the eccentrics and the bracket remain stationary.

For varying the ratio between the rotary speeds of the driving shaft and the driven shaft a mechanism may be provided adapted to close more or less the throttle-valve in the by-pass so that the resistance offered by the liquid in said by-pass and the speed of the plungers may be controlled whereby the eccentrics and also the bracket may rotate with variable speed.

For holding the brackets of the pinions gearing with the driven gear wheel, one of these brackets may be provided with projections coacting with corresponding fixed projections in such a manner that the said bracket is prevented from turning.

To obtain high efficiency and to minimize the number of coacting gear wheels when the driven shaft runs at the same speed as the driving shaft, one of the brackets of the pinions gearing with the driving gear wheel may be provided with projections adapted to move into the path of corresponding projections on said pinions when the bracket is axially displaced, the eccentrics in this case being so mounted on a sleeve fast to said bracket as to have facility of sliding but not of turning movement on said sleeve.

Another feature of the invention is that one of the brackets carrying the pinions coacting with the driven gear wheel is provided with projections adapted on axial displacement of said bracket to move into the path of corresponding projections on said pinions so as to prevent the latter from rotating about their own axes.

For a detailed description of the invention reference is had to the annexed drawing. In this drawing:

Figure 1 is a vertical longitudinal section of a transmission gear constructed in accordance with the principles of the present invention;

Fig. 2 is a cross sectional view on the line A—A in Fig. 1;

Fig. 3 is a vertical cross sectional view on the line B—B in Fig. 1, looking in the direction of the arrows, Fig. 4 shows the same view looking in the opposite direction;

Fig. 5 is a plan sectional view on the line C—C in Figs. 1 and 3;

Fig. 6 shows a detail, partially in elevation, partially in section;

Fig. 7 illustrates in cross section part of a modified embodiment of the invention, and Fig. 8 shows a detail of the mechanism in Fig. 7.

The driving shaft 1 is supported in a bearing 2 and secured to its end is a disk 3 with internal gear 4. The driven shaft 5, which is in axial alinement with the driving shaft 1, is supported by a bearing 6, and to the end of said shaft 5 is secured a disk 7 with internal gear 8.

Located between the ends of the shafts 1 and 5 and in axial alinement therewith is an intermediate shaft 9 supported by ball bearings 10 mounted in the disks 3, 7 and fast on this intermediate shaft are two gear wheels 11, 12. At either side of the gear wheel 11 the intermediate shaft 9 carries brackets 13, 14 loosely mounted thereon and serving to support the shafts of pinions 15, 16 gearing both with the internal gear 4 and with the gear wheel 11. Connected to or integral with the bracket 14 are two eccentric disks 17, 18 turned the one through 180° relative to the other and connected by rods 19, 20 with plungers 21, 22 adapted to reciprocate in cylinders 23, 24. The said cylinders are in communication with one another through by-passes 25 filled with a suitable liquid, for instance, oil. In each of the said by-passes is provided a throttle-valve or the like. In the example illustrated this valve is formed by a cylinder 26 with a plunger 27 to which reciprocating motion may be imparted by levers 28 pivoted on studs 29.

At either side of the gear wheel 12 the intermediate shaft 9 carries brackets 30, 31 loosely mounted thereon and serving to support the shafts of pinions 32, 33 gearing both with the internal gear 8 and with the gear wheel 12, the bracket 30 being provided with projections 34 adapted to move between corresponding projections 35 on the pinions 32, 33. When the bracket 30 is axially displaced by the levers 36 in the direction of the said pinions the said projections will engage one another whereby the pinions 32, 33 are prevented from turning about their own axes.

The mechanism described so far is mounted in a casing 37 partially filled with oil.

The operation of the gear is as follows:

Assuming the driving shaft 1 with the gear wheel 4 to turn in a given direction and with a given number of revolutions per minute, and the brackets 13, 14 to be prevented from revolving, the pinions 15, 16 turn about their axes in the direction of the arrow shown in Fig. 2, so that the gear wheel 11 and the shaft 9 turn in a direction opposite to that of shaft 1. The rotary motion of shaft 9 and gear 12 is transmitted in a similar manner to the pinions 32, 33, to gear wheel 8 and to shaft 5, provided that the brackets 30, 31 remain stationary, whereby the driven shaft 5 rotates in the same direction as the driving shaft 1.

It will be understood that the rotary speed of shaft 5 will be equal to that of shaft 1 assuming the diameter of wheel 4 being equal to that of wheel 8, and the diameters of gear 11 and pinions 15, 16 being equal to those of gear 12 and pinions 32, 33 respectively.

The bracket 14 may as follows be prevented from turning freely about its shaft:

When the rod 38 is pulled down, the plungers 37 move upward whereby the by-passes 25 are closed and the plungers 21, 22, owing to the by-passes 25 and the cylinders 23, 24 being filled with oil, are absolutely prevented from reciprocating, so that the eccentrics 17, 18 and the bracket 14 secured thereto remain stationary. Consequently, the gear 11 and the pinions 15, 16 turn as described, and intermediate shaft 9 is rotated.

The bracket 30 may be held stationary by projections 44 provided thereon and coöperating with corresponding projections 45 and 46 on the casing 37 and the lever 36 respectively. As the bracket 30 remains stationary the gear 12 and the pinions 32, 33 cause the gear wheel 8 and the driven shaft 5 to turn.

When it is desired for shaft 5 to turn at a lower speed than shaft 1, the rod 38 is moved upward, whereby the plungers 27 move down so as to put into communication with one another those parts of the by-pass 25 that connect the cylinder 26 with the cylinders 23 and 24, and a small quantity of oil may be pressed from cylinder 23 into cylinder 24, and vice versa. The plungers 27 now have freedom of slow motion, whereby also the eccentrics 17, 18 and the bracket 14 are allowed to turn at low speed. That is to say, shaft 9 will turn at a lower speed than when the bracket 14 was stationary, as the pinions 15, 16, besides turning about their own axes, also rotate about shaft 9. The wider the opening between both parts of the by-pass 25, the lower the resistance against the motion of the plungers 21, 22, and the higher the rotary speed of the eccentrics 17, 18 and of bracket 14. The throttle-valve or the like in the by-pass 25, therefore, permits control of the resistance against the motion of the plungers, and, thereby, varies in a very simple manner the ratio of speed between the shafts 1, 9 and 5 respectively. When the communication between both parts of the by-pass 25 is entirely free so that the plungers 21, 22, the eccentrics 17, 18 and the bracket 14 have freedom of motion, the pinions 15, 16 will only rotate about shaft 9 and no motion from shaft 1 is transmitted to shaft 5.

As the oil in the cylinders 23, 24 and in the by-pass 25 is under high pressure when the bracket 14 is stationary, whereby leakage might occur, the said space may be connected with a reservoir containing oil under suitable pressure so that oil from this tank may flow through a check valve into the said space, if necessary.

To obtain high efficiency when the shaft 5 is turning at top speed, i. e. at the same speed as shaft 1, an arrangement is provided whereby the pinions 15, 16 may be prevented from rotating about their own axes, see Fig. 7. In this case the eccentrics 17, 18 are not fast to the bracket 14, which is provided with projections 39 adapted to move between corresponding projections 40 of the pinions 15, 16 when the bracket 14 is displaced axially. If now the rod 38 is pressed upward so that the plungers 21, 22 are free to reciprocate and the eccentrics 17, 18 have facility of rotary motion, the bracket 14 being coincidently moved toward the pinions 15, 16 by the same rod 38, then the said pinions are prevented by the projections 39, 40 from revolving about their own axes. Owing to the rotary motion of the gear 4, the pinions 15, 16 and the bracket 14 turn as a whole without the pinions rotating about their own axes. It will be understood that the said pinions in this case only serve as levers for transmitting rotary motion to shaft 9, whereby the frictional resistance is greatly reduced and the efficiency increased.

If a reduction of the speed of shaft 1 is required, the bracket 39 is again placed in the position shown in Fig. 7, and the speed controlled by the rod 38 in the manner described. In this embodiment of the invention the eccentrics 17, 18 are slidably mounted on a sleeve being square in cross-section and integral with the bracket 14, so that the eccentrics may remain stationary when the bracket 14 is axially displaced.

The operating lever 36 serves to effect the reversal of the motion of shaft 1. When this lever assumes the position shown in Fig. 1 of the drawing the bracket 30, being engaged by the projections 45, 46, is prevented from rotating so that the driven shaft 5 will turn as described in the same direction as the driving shaft 1. If however the lever 36 is moved into the position shown in dash and dot line whereby the bracket 30 slides toward the pinions 32, 33, the projections 34 on the bracket 30 engage the projections 35 of the pinions 32, 33 which are thus prevented from turning about their own axes. Further, the bracket 30 is no longer held by the projections 45, 46, so that it is free to rotate about the shaft 9 together with the pinions 32, 33 which, in the same manner as described in connection with Fig. 7, act as levers for transmitting the rotary motion of shaft 9 in a reversed direction on gear 8 and on shaft 5, and the speed may now again be controlled by means of the plungers 27 in quite the same manner as previously explained.

From the foregoing it follows that the mechanism for transmitting, controlling and reversing the rotary motion is adapted to operate without it being required to throw gear wheels into or out of action. To operate the mechanism it is only required to move the rod 38 up or down for controlling the speed, and to turn the lever 36 for effecting the reversal of the motion.

In the examples shown there are two pinions 15, 16 and also two pinions 31, 32, but it will be understood that this is not strictly necessary for realizing the objects of the invention, and that said arrangement only serves to insure a better distribution of forces. For the same reason it is preferable to provide for twin cylinders 23, 24 for controlling the speed, although one set of cylinders would do for the purpose.

What I claim is:

1. A change-speed mechanism, including in combination, a driving shaft, a driven shaft in axial alinement therewith, an intermediate shaft between and in axial alinement with the driving and driven shafts, a gear wheel fixed on the driving shaft, a gear wheel fixed on the driven shaft, brackets loosely mounted on the intermediate shaft, sets of pinions rotatably supported on the brackets and correspondingly meshing respectively with the gear wheels on the driving and driven shafts, other gear wheels on the intermediate shaft also meshing with the corresponding sets of pinions, means for preventing the pinion supporting brackets which coact with the driving gear wheel in turning about the shaft consisting of two eccentrics turned the one through 180° relative to the other, stationary cylinders, plungers reciprocable therein, coupling rods between the eccentrics and the plungers, a liquid filled bypass establishing communication between the cylinders and a throttle valve provided in the bypass in such a manner that on closing the valve the plungers are prevented from reciprocating whereby the eccentrics and the brackets remain stationary while the rotary motion of the driving shaft is transmitted to the gear wheel on the intermediate shaft through the gear wheel on the driving shaft and the corresponding coacting sets of pinions and from the intermediate shaft to the gear wheel on the driven shaft through the gear wheel on the intermediate shaft and the corresponding sets of pinions.

2. A change-speed mechanism as claimed in claim 1 wherein a mechanism is provided for varying the ratio between the rotary speeds of the driving shaft and the driven shaft by more or less closing the throttle valve in the by-pass so that resistances offered by the liquid in said by-pass and the speed of the plungers will be regulated whereby the eccentrics and the bracket may rotate with variable speed.

3. A change-speed mechanism as claimed in claim 1 wherein coacting projections are provided for holding stationary the bracket supporting the pinions gearing with the driving gear wheel, certain of the projections being carried by the bracket while the remaining projections are fixed and are adapted to be engaged by the projections on the bracket.

4. A change-speed mechanism as claimed in claim 1 wherein coacting projections are provided, certain of which are carried on the ends of the bracket supporting the pinions gearing with the driving gear wheel and are adapted to move into the path of the other projections carried on the said pinions when the bracket is axially displaced, and a sleeve fast on the said bracket for supporting the eccentrics in such a manner as to have the facility of sliding but not of turning motion on said sleeve.

5. A change-speed mechanism as claimed in claim 1 wherein coacting projections are provided on the brackets and pinions which coact with the driven gear wheel, the projections on the bracket being adapted on axial displacement of the bracket to move into the path of the corresponding projections on said pinions so as to prevent the pinions from rotating.

In testimony whereof I affix my signature.

ARNO BOERNER.